Nov. 9, 1954     D. R. CHRISTIAN     2,694,145
DEMODULATOR APPARATUS

Original Filed May 23, 1947     2 Sheets-Sheet 1

*INVENTOR.*
DEAN R. CHRISTIAN
BY
*Ebes J. Hyde*
ATTORNEY

INVENTOR.
DEAN R. CHRISTIAN
ATTORNEY

2,694,145

DEMODULATOR APPARATUS

Dean R. Christian, Medina, Ohio, assignor, by mesne assignments, to Clevite Corporation, Cleveland, Ohio, a corporation of Ohio Original application May 23, 1947, Serial No. 750,006, now Patent No. 2,574,207, dated November 6, 1951. Divided and this application February 1, 1951, Serial No. 208,926

1 Claim. (Cl. 250—27)

This is a division of my application Serial No. 750,006, filed May 23, 1947, for Magnetic Recording and Reproducing which relates broadly to disk type magnetic recording and reproducing equipment.

The present invention relates to improvements in apparatus for recording transient or other signals for later observation and is more particularly concerned with improvements in systems in which the signals to be observed are recorded upon an endless recording medium by use of a carrier wave which is frequency modulated by the signals, this record being used to actuate an indicator through the intermediary of a pickup or reproducer and a frequency discriminator.

According to the present invention, improved and novel means are provided for frequency modulating the carrier wave by the signal to be recorded. As another feature of the invention, improved and novel frequency discriminator apparatus is provided for converting the frequency-modulated signal picked up from the record into a faithful reproduction of the input signal.

For a better understanding of the present invention, together with other and further objects thereof, reference is had to the following description taken in connection with the accompanying drawings, and its scope will be pointed out in the appended claim.

Figure 1:
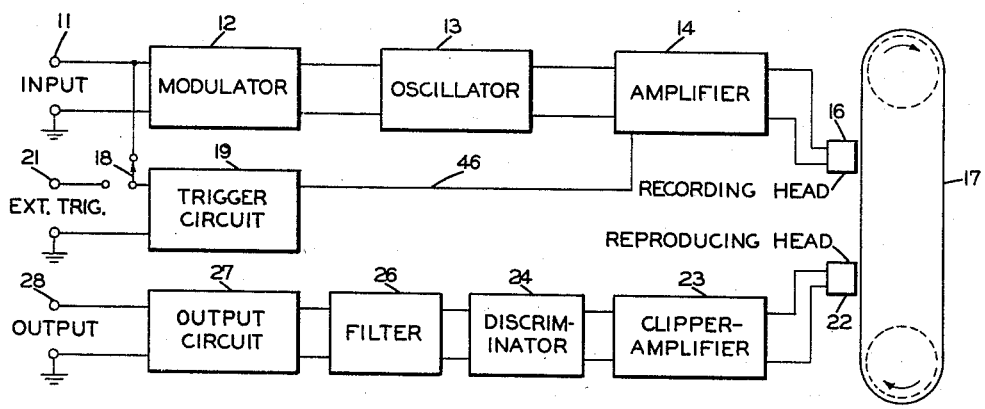
Fig. 1 is a block diagram of a transient analyzer system exemplifying the invention.

Fig. 1 shows the general system of the present invention, as applied to a transient signal analyzer, although it will be apparent that this is merely an exemplification of the invention, which is not limited to this use. The transient or other signal to be recorded is impressed upon the input terminal 11 connected to a modulator circuit 12, which in turn is connected to an oscillator 13 to frequency modulate the output of oscillator 13 in accordance with the signal impressed upon input terminal 11. The frequency-modulated output from oscillator 13 is amplified by an amplifier 14 and thereafter fed to the recording head 16 which is in operative relationship to an endless recording medium 17, such as a magnetic wire or tape, which is continuously rotated at a constant speed in a given direction (for example, clockwise) by constant-speed motive means which are not shown. The input signal supplied to input terminal 11 is also fed through a switch 18 to a trigger circuit 19 which is connected to amplifier 14.

As will be shown hereinafter, these circuits are so arranged that a predetermined time interval after the transient signal begins, the trigger circuit 19 operates to cut off amplifier 14 so as to halt the recording operation. This time interval is related to the time required for one complete revolution of the recording medium so that the record formed in the recording medium will represent a faithful version of the input signal occurring during the period of one revolution. Switch 18 alternatively connects the trigger circuit 19 to external terminal 21 so that the cutting off of the recording process can be controlled by any desired signal impressed upon external terminal 21.

Also in operative relation to the recording medium 17 is a reproducing or pickup head 22 which is actuated by the magnetic condition of the recording medium 17 produced by the recording head 16 to produce signals corresponding to the frequency-modulated carrier signal which excited the recording head 16. This picked-up signal is fed to a clipper-amplifier and pulse-forming circuit 23 which serves to produce a series of uniform-intensity, short-duration pulses occurring in synchronism with the reversals of polarity or "zeros" of the frequency-modulated carrier signal picked up by the reproducing head 22. The output pulse wave from the circuit 23 is then fed to a discriminator 24 which converts it into a faithful version of the input signal supplied to input terminal 11. The output of discriminator 24 is supplied through a filter 26 and an output circuit 27, containing any necessary amplifying or isolating stages, to output terminal 28, from which the output signal can be connected to any desired indicator circuit, such as a cathode ray tube.

The system thus far described is generally similar to that illustrated in U. S. Patent No. 2,513,683, granted July 4, 1950, in the names of H. B. Shaper and H. B. Miller, and assigned to the same assignee as the present application, but differs therefrom in several notable respects. Thus, the obliterating circuit arrangement shown in said prior application has been omitted. In place thereof, the present system relies upon the action of the recording head 16, in the absence of modulating signals at the input to modulator 12, to provide obliterating action. The unmodulated carrier output from oscillator 13 as amplified by amplifier 14 is made to have an amplitude sufficiently high to cause magnetic saturation of the recording medium 17 over a substantial portion of each half-cycle of carrier wave alternation. Thus, during the major portion of each positive half-cycle of the carrier wave, the medium is magnetically saturated with a given polarization, while during the major portion of each negative half-cycle, the medium is similarly saturated but with opposite polarization. During intervals adjoining the reversal of polarity or instantaneous zero values of the carrier wave, the magnetization changes rapidly from maximum "positive" to maximum "negative." In the absence of modulating signal, these polarity-reversals or "zeros" have equal time separation. However, by frequency-modulating the carrier wave by the modulating signal, this time separation varies in correspondence with the modulating signal amplitude. Since, as will be seen, it is this time-separation which is utilized by the discriminator to produce the output signal, the saturation of the recording medium between these "zeros" has no effect upon the reproduction of the desired signal. However, this saturation is relied upon for obliterating action. Thus, before any transient or other signal is received to be recorded, the oscillator 13 is operating continuously and thereby saturates the recording medium almost completely, except in the immediate vicinity of the recorded "zeros." Each time the recording medium makes a complete revolution, the former "zeros" are wiped out by the saturating effect of the carrier wave between new "zeros." If it should coincidentally occur that the new "zeros" overlap the old "zeros" for any revolution (which is extremely unlikely in view of the very long duration of the saturating portions of the carrier wave cycle relative to the non-saturating portions), then the succeeding revolution will again erase the old "zeros," since the probability of further coincidence of new and old "zeros" is practically zero. Thus, the unmodulated oscillations from oscillator 13 supplied from amplifier 14 to recording head 16 assume the same functions formerly performed by the separate obliterating head and its circuit, now rendered unnecessary. In this way a much simpler circuit is possible, leading to greater compactness, lighter weight, and lower cost.

Figure 2:
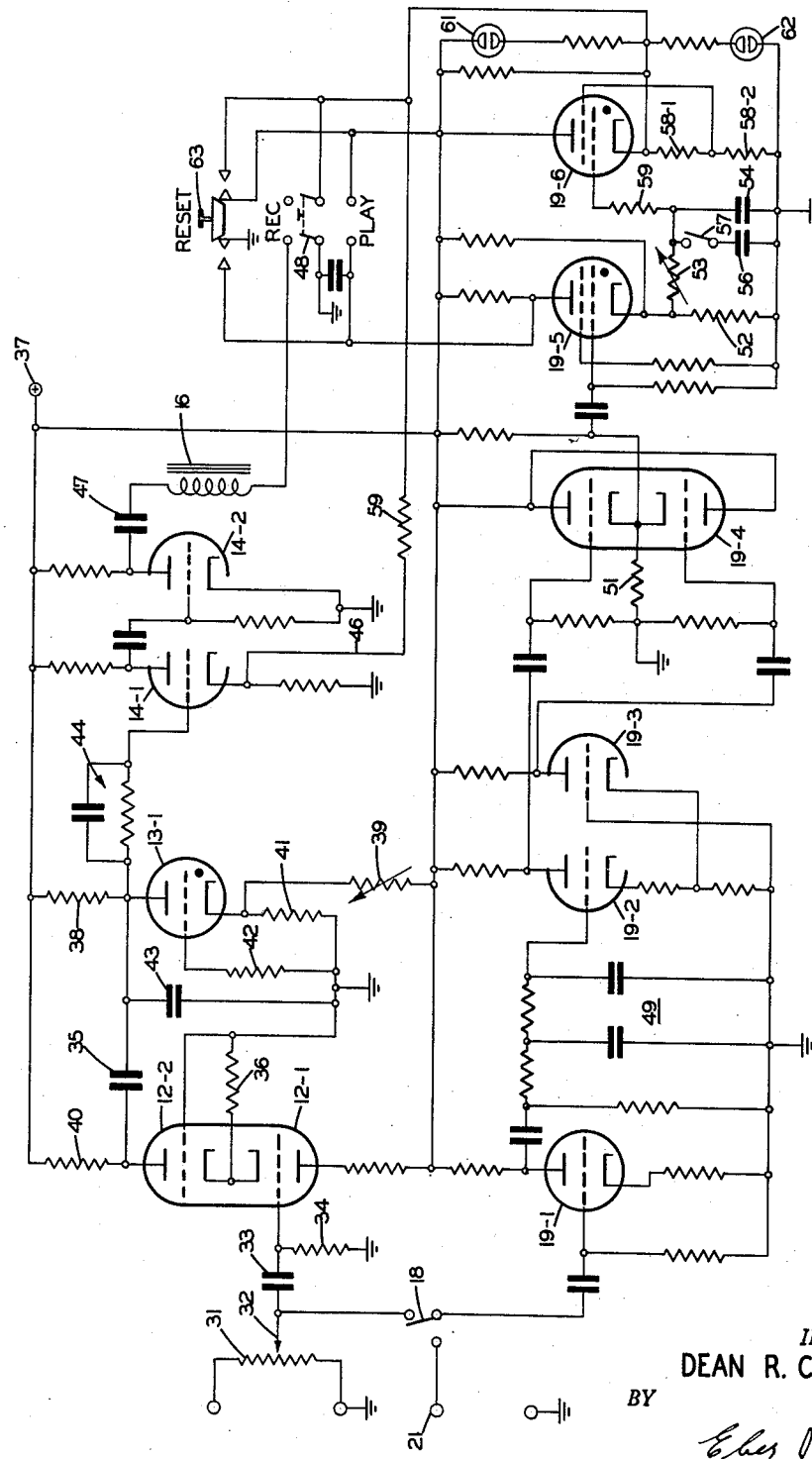
Fig. 2 is a schematic circuit diagram of the modulator, oscillator, amplifier, and trigger circuits of the system of Fig. 1 forming the recording portion of the system.

Fig. 2 shows the circuit diagram of the recording portions of the system of Fig. 1. In this figure, the input terminal 11 is connected to an input potentiometer 31, adjustment of whose variable tap 32 adjusts the magnitude of the input signal supplied to the remainder of the circuit. This tap 32 is connected through a coupling condenser 33 and an input resistor 34 to the control grid of one section 12–1 of a dual-triode modulator tube 12, serving as a cathode-follower amplifier having an output resistor 36 in its cathode circuit. The control grid of the second section 12–2 of modulator tube 12 is connected to this output resistor 36 and thereby serves to further amplify the input signal.

The modulator tube section 12–2, as will be seen, serves to modulate the output of the oscillator, which is provided by a tube 13–1 of the gas-filled type, such as the type 884, for example, whose anode is connected through a resistor 38 to the source 37 of positive plate supply potential, and whose cathode is maintained at a fixed adjustable positive potential by its connection to a voltage divider provided by adjustable resistor 39 and fixed resistor 41 connected in series between the positive plate supply terminal 37 and ground. The control grid of oscillator tube 13–1 is connected to ground through a resistor 42. A condenser 43 is connected between the anode of oscillator tube 13–1 and ground.

In operation, condenser 43 is charged up through resistor 38 until the firing potential of oscillator tube 13–1 is reached, whereupon tube 13–1 becomes conductive to discharge condenser 43. When the discharge ceases, tube 13–1 becomes non-conductive, and thereafter condenser 43 recharges. The cycle is repeated to produce oscillations across the condenser 43. The frequency of operation is adjusted by adjustment of the bias on the cathode of tube 13–1, as by the variable resistor 39.

The anode of modulator tube section 12–2 is connected through a resistor 40 to the positive plate supply terminal 37, and also through blocking condenser 35 to the anode of oscillator tube 13–1. Blocking condenser 35 is of large capacitance relative to oscillator condenser 43.

It will be seen that the potential of the modulator tube section anode is determined by the voltage divider comprising resistor 40 and the internal impedance of tube section 12–2, and hence varies proportionately to the modulating signal applied to the control grid of modulator tube section 12–2.

Oscillator resistor 38 is of very high resistance, such as of the order of two megohms, so that substantially constant current $I_1$ flows through it. As the modulator tube anode potential varies in correspondence with the modulating signal, condenser 35 either diverts a part of the current $I_1$ away from the condenser 43 and oscillator tube 13–1, or by its discharge adds to the current to the condenser 43 and tube 13–1, according to the sense of variation of the modulator tube anode potential. This correspondingly delays or advances the instant of firing of oscillator tube 13–1, which results in a frequency modulation of the oscillations produced by oscillator tube 13–1, as will be seen from the following brief analysis.

The change in charge Q of oscillator condenser 43 between the discharged condition and the maximum-charged condition equals $Ce$, where C is a capacitance of condenser 43 and $e$ is the voltage change across condenser 43 from a discharge to a charged condition. The current I through the oscillator tube 13–1 equals the amount of charge through the tube per second, which in turn equals the change in charge Q of condenser 43 times the number of discharges per second, which is the frequency $f$. The frequency of oscillation $f$, therefore, equals the tube current I divided by Q. Since for any given set of circuit constants and operating potentials, the average plate voltage of tube 13–1 and the current $I_1$ through resistor 38 are constant and $$I_1 \text{ equals } \frac{E - E_p}{R}$$

where R is the resistance of resistor 38, E is the supply potential of terminal 37, and $E_p$ is the average potential of oscillator tube 13–1. Also the oscillator tube current I equals $I_1 - I_2$, where $I_2$ is the current through the condenser 35 and modulator tube section 12–2. $I_2$ is proportional to the grid voltage $E_g$ of modulator tube 12–2, so that the frequency of oscillation $$f = \frac{I_1 - I_2}{Q} = \frac{I_1 - kE_g}{Q}$$

and is thus proportional and linearly related to the modulating voltage $E_g$.

The use of condenser 35 permits the operating potentials of modulator tube section 12–2 to be determined independently of the oscillator tube circuit, so that drift in modulator operating characteristics, such as due to supply potential variations, will not affect the average oscillator frequency. Of course, where such drift is not an important problem, condenser 35 and resistor 40 may be omitted, and the anode of modulator section 12–2 is connected directly to the anode of oscillator tube 13–1. In such case, modulator section 12–2 operates as before to divert more or less of the current from oscillator tube 13–1, so as to produce frequency modulation of the output.

Since the ionization time of thyratron tubes, such as used for oscillator tube 13–1, is finite and variable (being of the order of 5 to 10 microseconds) the actual discharge of condenser 43 through tube 13–1 does not occur exactly at the same voltage but depends slightly upon the frequency; that is, even after the correct discharge voltage is reached, a variable amount of further charging occurs during the 5 to 10 microseconds required for tube 13–1 to ionize. This means that the charge on condenser 43 is not constant. The variation in charge is proportional to the rate of charge of the condenser, which is proportional to frequency. Since the frequency of the oscillator is proportional to the current flowing into the circuit, the error is proportional to the current of tube 13–1. Also, the firing potential of the tube 13–1 is proportional to its grid voltage. Hence, to reduce this error, the bias on tube 13–1 may be reduced slightly as a function of the oscillations produced, so as to make the firing point independent of frequency. This may be done by impressing a predetermined or adjustable fraction of the input modulating signal upon the control grid of tube 13–1 in phase opposition to the signal applied to the grid of modulator section 12–2. Since the oscillator frequency is raised when a negative voltage is applied to the modulator grid, a positive voltage is thus applied to the oscillator tube grid, making the tube firing point lower to compensate for the condenser voltage rise due to the delay in firing due to the ionization time. This circuit refinement thus reduces distortion and allows a greater frequency swing in the modulation process.

In this way the frequency of oscillation of oscillator tube 13–1 is substantially linearly proportional to the input signal voltage, so that the oscillator output is a frequency-modulated version of the input signal. This output is, of course, not a sine wave and is hence passed through a filter arrangement 44 to the first stage 14–1 of the amplifier 14, which is designed so as not to load the oscillator. This first amplifier stage 14–1 has its cathode bias provided from a lead 46 which is connected to the trigger circuit 19, as will be described. The amplified version of the frequency-modulated waves produced by amplifier stage 14–1 is coupled to the second amplifier stage 14–2, whose output is then coupled through a condenser 47 to the recording head 16, by way of a record-playback switch 48 when in the upper or "Record" position.

The trigger circuit 19 comprises an amplifier stage 19–1, a filter 49, a further amplifier 19–2, and a phase inverter 19–3 supplying a balanced cathode-follower amplifier 19–4 having its output resistor 51 coupled to a gas tube 19–5. In operation, a transient to be recorded (or other signal) is received at input terminal 11 and is amplified at stage 19–1. The higher frequency components of the signal and spurious higher frequency signals are eliminated in the filter 49. By virtue of the following stages 19–2, 19–3 and 19–4, a positive potential is produced across output resistor 51 no matter what polarity of input is received. Generally this positive potential will appear as a pulse signal. This positive potential is impressed upon the grid of gas tube 19–5 to render it conducting, whereupon a volt-drop is produced across its cathode resistor 52. Once made conducting, tube 19–5 remains so until reset as described below. Connected across the cathode resistor 52 is a time-delay circuit comprising an adjustable resistor 53 and a condenser 54. The time delay offered by resistor 53 and condenser 54 is adjusted to be substantially equal to or slightly less than the time required for one complete revolution of the recording medium 17.

Under some conditions, it may be desired to have a longer interval of recording, in which case it is possible either to reduce the speed of rotation of the recording medium or to supply a longer recording medium. In this case, by closing a switch 57, a further condenser 56 is connected in parallel with condenser 54 to increase the resultant capacitance, so that the time delay offered by this time-delay circuit is correspondingly increased to maintain the time delay substantially equal to the period of revolution of the recording medium.

The resulting delayed control signal is applied to the control grid of a second gas tube 19–6 to produce a positive volt drop across its cathode resistor 58–1, 58–2. This positive voltage is then supplied through a current-limiting resistor 59 to the lead 46. It will be noted that once tube 19–6 becomes conductive, the signal supplied to terminal 11 or 21 loses all control, and tube 19–6 remains conductive to apply positive potential to lead 46 until the system is reset.

In his way the input transient signal, after being amplified and delayed, provides a high positive control potential which is applied by lead 46 to the cathode of amplifier 14–1 to maintain the amplifier 14–1 cut off, whereby no further recording current flows to the recording head 16. The circuit is arranged so that, after substantially one complete revolution of the recording medium has been recorded upon, following initiation of the signal to be recorded, the recording head 16 is thereafter maintained permanently deenergized until the system is reset, as will be described.

To indicate the condition of operation, a pair of indicator lamps, such as the neon type, are used. Recording indicator lamp 61 is connected across the cathode-anode circuit of tube 19–6 and will remain excited while tube 19–6 is non-conducting, being extinguished when tube 19–6 becomes conductive. A playback indicator 62 is connected across the cathode resistor 58–1, 58–2 of tube 19–6 and remains deenergized while tube 19–6 is non-conductive. Since tube 19–6 is non-conductive during periods when no transient signal has been received, it will be apparent that this condition is indicated by the excitation of indicator lamp 61 which shows that the system is in a recording condition. However, after the transient signal has been received and recorded, recording indicator lamp 61 goes out and playback indicator lamp 62 becomes excited, thereby indicating that the system is in condition for playback of the recorded version of the input transient signal.

If it is desired to maintain the circuit continuously in this playback condition, switch 48 is thrown to the lower or "playback" position. In so doing, tube 19–6 is permanently short-circuited so as to maintain its cathode at a high positive potential to maintain the amplifier stage 14–1 cut off. Also, and simultaneously, tube 19–5 has its anode grounded to render it non-responsive to later input signals, whereby it is made ineffective to alter the condition of tube 19–6. At the same time, the circuit of recording head 16 is interrupted by disconnecting it from ground, so that no further recording can take place. Thereupon, reproduction of the recorded transient signal can be performed whenever desired.

After the recorded signal has been utilized as desired, and when it is desirable to recondition the apparatus for recording a new signal, switch 48 is thrown to the upward or "Record" position. Thereupon the system is again in condition to resume recording of the next transient signal.

If it is desired to re-record before playback, or to erase the recorded signal, the switch 48 need not be thrown down to the "playback" position. Instead, the reset button 63 is depressed momentarily. This short-circuits tube 19–6 and grounds the anode of tube 19–5, whereupon both these tubes are rendered non-conducting. Upon release of reset button 63, tubes 19–5 and 19–6 will remain non-conducting until a new transient signal to be recorded is received. By rendering tubes 19–5 and 19–6 non-conducting, the cut-off bias for tube 14–1 is eliminated, whereby the carrier wave generated by oscillator tube 13–1 is supplied to the recording head 16 and acts to wipe out or obliterate the earlier recorded transient signal, in the manner described above. Of course, in so doing, the recording medium is now magnetized by the unmodulated carrier signal. However, this is immaterial, since no output signal is produced from the discriminator under these circumstances, as will be seen from the description below.

The reproducing head 22, of any conventional type, serves to produce currents in its output corresponding to the magnetization of the recording medium, and hence corresponding to the currents in the recording head which originally magnetized the recording medium. These reproduced currents will thus represent the unmodulated or modulated carrier wave output of the oscillator 13, as the case may be.

This signal produced by the reproducing head 22 is supplied to the clipper-amplifier circuit 23 which, for example, may comprise a sequence of limiting or class C amplifiers which clip off and square the tops and bottoms of the alternations of the frequency-modulated carrier signal to produce essentially a square-top frequency-modulated wave, which is supplied to a differentiating circuit to convert the square wave into a succession of positive and negative pulses, each positive or negative pulse corresponding to the vertical increasing or decreasing part of the square wave and hence representing a "zero" discussed above. The time interval between successive pairs of these pulses will then vary in accordance with the original modulating signal controlling the frequency of the oscillator 13. Such a circuit is shown, for example, in the above-mentioned Shaper and Miller application.

Figure 3:
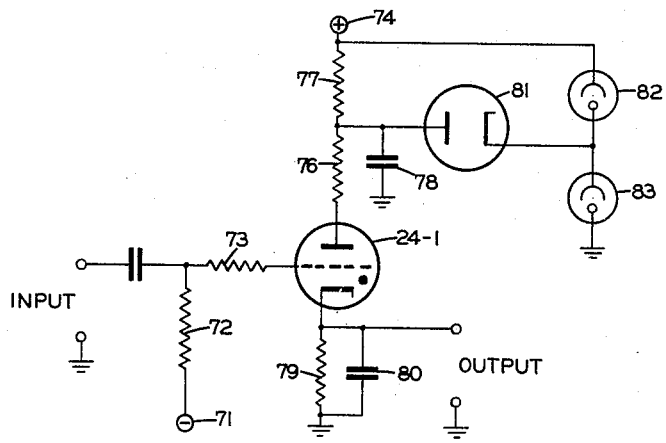
Fig. 3 is a schematic circuit diagram of the discriminator circuit of the system of Fig. 1.

These pulses are then supplied to the control grid of the grid-controlled gaseous rectifier tube 24–1 of Fig. 3 (such as the "Thyratron" type) serving as a frequency discriminator. This tube 24–1 is maintained biased to cut-off by a suitable source of negative potential indicated schematically at 71 and connected to the grid of tube 24–1 through an input resistor 72 and a current-limiting resistor 73. The plate of tubes 24–1 is connected to a source of positive potential indicated schematically at 74 through resistors 76 and 77. The junction of resistors 76 and 77 is then connected to ground through a condenser 78. The cathode of tube 24–1 is connected to ground through an output resistor 79 shunted by a condenser 80.

In the absence of input pulses impressed on its grid, tube 24–1 remains non-conductive by virtue of the cut-off grid bias. Under these conditions, the condenser 78 remains fully charged to the full voltage of the positive supply source 74. When a positive pulse is impressed on the control grid of tube 24–1, it becomes conducting and condenser 78 substantially completely discharges into the output condenser 80 which has a much larger capacitance.

During this short discharge interval, substantially no energy is supplied to condenser 80 from the positive supply source 74, since resistor 77 is designed to have a large value of resistance. As soon as condenser 78 is substantially completely discharged, the current through discriminator tube 24–1 decreases to such a low value that its grid resumes control, and the tube is again blocked, whereupon condenser 78 is again charged to the full positive potential of the source 74 before the next positive pulse arrives, whereupon it discharges again. Thus, each time a positive pulse reaches tube 24–1, it becomes conductive to add a fixed quantity of charge from condenser 78 to condenser 80.

Condenser 80 accumulates this charging for a time long compared to the period of the modulated carrier, by virtue of the relatively large time constant of condenser 80 and its shunt resistor 79. Accordingly, the average voltage assumed by condenser 80 will depend upon the number of such equal-energy pulses supplied to it per unit time. This number of pulses per unit time, of course, depends upon the number of positive pulses produced by the output of clipper-amplifier 23 which, in turn corresponds exactly to the frequency-modulating signal impressed upon the oscillator carrier, which in turn corresponds to the transient modulating signal. Thus, the average energy supplied to the condenser 80 corresponds to the transient modulating signal, and in this way the voltage appearing across condenser 80 is a faithful reproduction of the transient signal applied to the input terminal 11. It will therefore be clear that the circuit of tube 24–1 provides a simple and efficient discriminator arrangement for deriving the modulating signal of a frequency-modulating wave.

As just described, condenser 78 must reach a condition of substantially full charge during the time interval between successive positive pulses from clipper-amplifier circuit 23. This limits the maximum carrier frequency which can be used.

For higher carrier frequencies where the time interval between successive pulses becomes too short in relation to the time constant which can be provided for the condenser 78, use is made of the diode 81 connected between the junction of resistors 76 and 77 and a voltage divider provided by constant-voltage regulator tubes 82 and 83.

Figure 4:
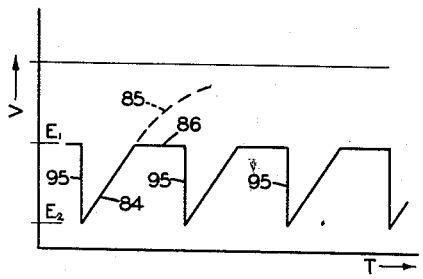
Fig. 4 is a graph useful in explaining the operation of the apparatus of Fig. 3.

The curve of Fig. 4 shows the manner in which diode 81 operates. With the diode 81 omitted, the charging of condenser 78 is shown by solid curve 84 and its dotted extension 85. It will be seen that the charging time is here too long relative to the pulse interval, shown by the vertical lines 95. However, diode 81 serves to decrease the charging time of condenser 78 by limiting the maximum voltage to a value such as $E_1$, shown by the flat top 86 of the curve. Diode 81, therefore, serves to cut off the exponential tail of the charging curve for condenser 78, since charging will stop as soon as diode 81 becomes conducting, which occurs when the potential of its anode (which is also the potential of condenser 78) exceeds the potential of the cathode as determined by the voltage divider 82, 83. Since this tail consumes a large part of the charging time without adding much to the charge on condenser 78, the elimination of the tail decreases the effective charging time of the condenser 78 and permits use of the present discriminator at higher carrier frequencies corresponding to more closely spaced pulses from circuit 23. This does not impair frequency-discriminating action, since each discharge of condenser 78 through tube 24-1 still adds a fixed constant amount of charge to condenser 80, although slightly smaller than the constant charge without the use of diode 81.

It will be seen that the system just described is strikingly independent of circuit distortion, because of its use of frequency modulation and saturation-recording. Therefore any non-linearity of the recording or reproducing circuits other than the modulator and discriminator has substantially no effect upon the reproduced signal, since the spacings of the recorded polarity-reversals and of the reproduced pulses fed to the discriminator are negligibly affected. In this way a particularly high fidelity system is provided.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

Frequency-discriminator apparatus for demodulating a frequency-modulated wave, comprising: input means for producing a pulse wave whose pulse separation instantaneously corresponds to the instantaneous frequency of said frequency-modulated wave, a first capacitor one side of which is connected to ground, a charging circuit connected to the other side of said capacitor and having a time constant smaller than said pulse separation, voltage limiter means including a tube the plate circuit of which is directly connected to the other side of said first capacitor, a second capacitor, a discharge circuit for said second capacitor having a time constant long compared to said pulse separation, a gas discharge trigger tube having a plate, grid and cathode connecting said capacitors in series with the plate connected to said first capacitor, the cathode connected to said second capacitor and the grid connected to said input means, said trigger tube becoming conductive when a predetermined voltage is reached and thereafter said grid being ineffective, a source of direct current power connected to the plate of said trigger tube and to the other side of said first capacitor, and means controlled by said pulse wave for rendering said trigger tube conductive during pulses of predetermined polarity whereby said first capacitor delivers a constant increment of charge to said second capacitor for each of said pulses, the voltage across said second capacitor thereby being a demodulated version of said modulated wave.

References Cited in the file of this patent

UNITED STATES PATENTS

| Number | Name | Date |
|---|---|---|
| 2,307,316 | Wolff | Jan. 6, 1943 |
| 2,500,536 | Goldberg | Mar. 14, 1950 |

FOREIGN PATENTS

| Number | Country | Date |
|---|---|---|
| 252,563 | Switzerland | Jan. 15, 1948 |